US012699430B2

(12) United States Patent
Shaw et al.

(10) Patent No.: US 12,699,430 B2
(45) Date of Patent: Aug. 4, 2026

(54) FLIGHT COMPONENT SIGNAL AUTHENTICATION

(71) Applicant: BETA AIR, LLC, South Burlington, VT (US)

(72) Inventors: Mike Shaw, South Burlington, VT (US); Tyler Arsenault, Cambridge, VT (US)

(73) Assignee: BETA Technologies, Inc., South Burlington, VT (US)

( * ) Notice: Subject to any disclaimer, the term of this patent is extended or adjusted under 35 U.S.C. 154(b) by 251 days.

(21) Appl. No.: 18/680,525

(22) Filed: May 31, 2024

(65) Prior Publication Data

US 2025/0368324 A1     Dec. 4, 2025

(51) Int. Cl.
| | |
|---|---|
| *G06F 1/26* | (2006.01) |
| *B64C 27/32* | (2006.01) |
| *B64D 27/34* | (2024.01) |
| *B64D 27/35* | (2024.01) |
| *H02P 27/00* | (2006.01) |
| *B64C 29/00* | (2006.01) |

(52) U.S. Cl.
CPC ................ *G06F 1/26* (2013.01); *B64C 27/32* (2013.01); *B64D 27/34* (2024.01); *B64D 27/35* (2024.01); *H02P 27/00* (2013.01); *B64C 29/0008* (2013.01); *B64D 2221/00* (2013.01)

(58) Field of Classification Search
CPC ....... G06F 1/26; B64C 27/32; B64C 29/0008; B64D 27/34; B64D 27/35; B64D 2221/00; H02P 27/00
See application file for complete search history.

(56) References Cited

U.S. PATENT DOCUMENTS

| | | | |
|---|---|---|---|
| 11,745,890 B1 * | 9/2023 | Clark ..................... | B64D 37/04 |
| | | | 244/135 R |
| 2017/0213043 A1 * | 7/2017 | Rajnak ................ | G06F 21/6218 |
| 2019/0113558 A1 * | 4/2019 | Kumar .................. | G01R 31/40 |
| 2022/0171444 A1 * | 6/2022 | Underwood ............. | G06F 1/26 |
| 2023/0096639 A1 * | 3/2023 | Hall .......................... | G06F 1/26 |
| | | | 713/300 |
| 2023/0134808 A1 * | 5/2023 | Wiegman ............. | B60L 3/0046 |
| | | | 320/109 |

* cited by examiner

*Primary Examiner* — Cheng-Feng Huang
(74) *Attorney, Agent, or Firm* — Lee & Hayes, P.C.

(57) ABSTRACT

Systems and techniques for state control of a flight component of an electric aircraft that includes a high voltage connection to a power supply of the electric aircraft and a communication connection to a communication system of the electric aircraft. The flight component is configured with a hardware circuit designed and configured to receive and/or read a signal on the communication system, compare an identifier of the signal against a stored identifier of the flight component, and in response to the identifier matching the stored identifier, cause the flight component to change from a first state to a second state.

20 Claims, 8 Drawing Sheets

700

DETECT SIGNAL ON SERIAL BUS
702

PERFORM SEQUENCE DETECTION ON SIGNAL
704

No

IDENTIFIER MATCHES STORED IDENTIFIER?
706

YES

POWER ON/OFF AT COMPONENT BASED ON IDENTIFIER AND PAYLOAD OF SIGNAL
708

700 ⟍

FLIGHT COMPONENT SIGNAL AUTHENTICATION

BACKGROUND

Aircraft flight control systems perform the critical function of converting pilot inputs into control signals for various components and surfaces of an aircraft. Reliable and responsive flight control is important for proper functioning and safety of the aircraft during flight operations. Many aircraft systems today utilize fly-by-wire control systems to translate pilot inputs into signals that control the aircraft.

Systems on aircraft are commonly controlled and operated using signals on a communication bus of the aircraft to transmit signals to one or more components of the aircraft sequentially in time and using a common medium. This arrangement reduces complexity in the wiring harness of the aircraft. The components of aircraft are controlled by one or more processors under the direction of a flight controller, based on commands received over the bus from the flight controller.

SUMMARY

In some examples, the systems and techniques described herein provide a flight component of an electric aircraft having a high voltage connection to a power supply of the electric aircraft. The component also includes a communication connection to a bus of the electric aircraft. The component includes a hardware circuit configured to receive a bus signal on the bus, compare an identifier of the bus signal against a stored identifier of the flight component, and in response to the identifier matching the stored identifier, cause the flight component to change from a first state to a second state.

In some examples, the flight component may include a motor for a propulsor of the electric aircraft, and an inverter configured to provide power to the motor and control operation of the electric aircraft in response to signals from a flight controller, where the hardware circuit is coupled to the inverter and configured to cause the inverter to change from the first state to the second state. The first state may include a power-off state, the second state may include a power-on state, and when the flight component is in the second state, a processor of the inverter is configured to control operation of the inverter in response to the signals from the flight controller. The hardware circuit may include a programmable logic device. The hardware circuit may include a shift register and a comparator. The bus signal may include a series of messages, and the hardware circuit being configured to compare the identifier against the stored identifier may include comparing a first identifier of a first message of the series of messages against at least a first portion of the stored identifier, and comparing a second identifier of a second message of the series of messages against at least a second portion of the stored identifier. The hardware circuit being configured to cause the flight component to change from the first state to the second state may include enabling the power supply of the electric aircraft to provide power to the flight component in the second state, where the flight component is controllable in the second state by a flight computer of the electric aircraft. The bus signal may include a first signal from a first flight controller and a second signal from a second flight controller. The hardware circuit may include a sequence detection state machine. The hardware circuit being configured to compare the identifier against the stored identifier may include performing a bit-wise comparison of the identifier and the stored identifier.

In an illustrative example, one general aspect includes a propulsor for an electric aircraft including a motor. The propulsor may also include an inverter configured to provide power to drive the motor, the inverter including a high voltage connection between a power supply of the electric aircraft and the inverter and a hardware circuit connected to a bus of the electric aircraft. The hardware circuit is configured to receive a plurality of bus messages on the bus, compare an identifier of a bus message of the plurality of bus messages against a stored identifier of the propulsor, and in response to the identifier matching the stored identifier, cause the inverter to change from a first power state to a second power state.

Implementations may include one or more of the following features. The bus may include a controller area network (CAN) bus of the electric aircraft. The first power state may include a power-off state, the second power state may include a power-on state, and when the inverter is in the second power state, a processor of the inverter is configured to control operation of the inverter in response to signals from at least one flight controller. The bus messages may include a first message from a first flight controller and a second message from a second flight controller and the hardware circuit being configured to compare the identifier against the stored identifier may include comparing a first identifier of the first message against the stored identifier and comparing a second identifier of the second message against the stored identifier. The hardware circuit being configured to compare the identifier against the stored identifier may include the hardware circuit being configured to perform a bit-wise comparison of the identifier against the stored identifier and perform a bit-wise comparison of a payload of the bus message against a stored identifier, and wherein causing the inverter to change to the second power state is in response to the identifier matching the stored identifier and the payload matching a pre-coded message stored in associated with the stored identifier. The hardware circuit may include a sequence detection state machine.

In an illustrative example, one general aspect includes an electric aircraft including a power supply, a flight controller, and a bus connected to the flight controller. The electric aircraft also include a propulsor connected to the bus and the propulsor includes a motor and an inverter configured to provide power to drive the motor. The inverter includes a high voltage connection between a power supply of the electric aircraft and the inverter and a hardware circuit connected to the bus of the electric aircraft. The hardware circuit is configured to receive bus messages on the bus, compare an identifier of a bus message of the bus messages against a stored identifier of the propulsor, and in response to the identifier matching the stored identifier, cause the inverter to change from a first power state to a second power state.

Implementations may include one or more of the following features. The flight controller may be a first flight controller, and may include a second flight controller connected to the bus, and wherein the identifier is a first identifier of the bus message from the first flight controller and the hardware circuit being configured to cause the inverter to change to the second power state is further in response to a comparison of a second identifier of a second bus message from the second flight controller. The first power state may include a power-off state, the second power state may include a power-on state, and when the propulsor is in the second state, a processor of the inverter is configured to control operation of the inverter in response to signals from the flight controller. The hardware circuit being configured to compare the identifier against the stored identifier may include the hardware circuit being configured to perform a bit-wise comparison of the identifier against the stored identifier and perform a bit-wise comparison of a payload of the bus message against a pre-coded message, and wherein causing the inverter to change to the second power state is in response to the identifier matching the stored identifier and the payload matching the pre-coded message.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
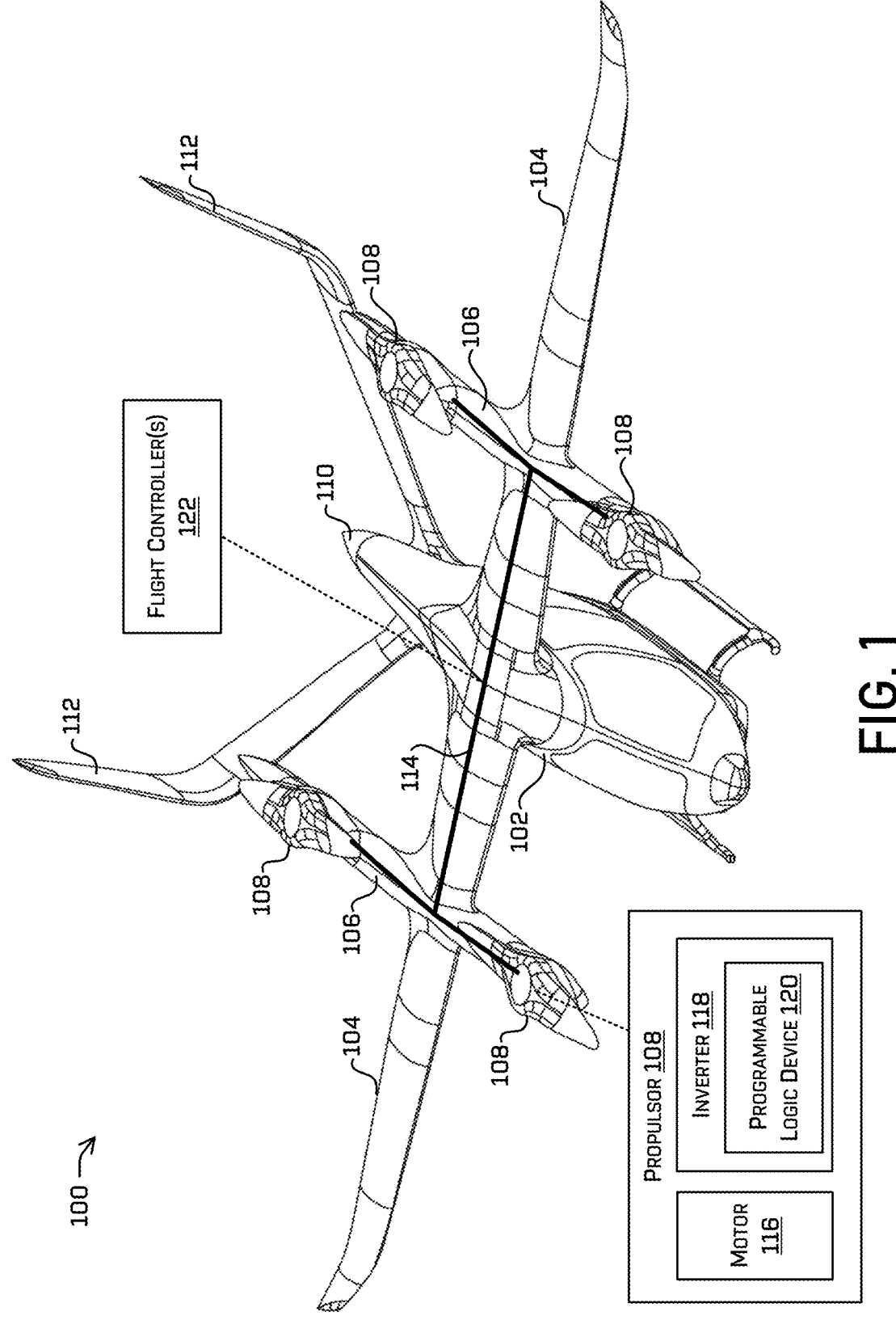
FIG. 1 depicts an example of an electric aircraft implementing a serial bus authentication for flight components, according to at least one example.

The present description provides systems and techniques related to operating an aircraft, such as an electric aircraft. An example of an electric aircraft that may operate in accordance with the techniques described herein is an electric vehicle take-off and landing (eVTOL) aircraft that uses electric power to take off, hover, and land vertically. However, a person of ordinary skill in the relevant technology will recognize that other types of aircrafts and vehicles (e.g., cars) may use the techniques described herein.

In some examples, the systems and techniques described herein relate to controlling the operation (e.g., an aspect of the operation) of a component of an aircraft, such as an inverter used to provide electric energy to the aircraft's motor, or an actuator used to control positioning of a control surface (e.g., an aileron, an elevator, a rudder, and/or the like) of the aircraft. In accordance with some of the techniques described herein, a command processor may receive a command pilot signal generated by a flight controller component based on pilot control input data. The command processor may convey information to one or more components of the aircraft to instruct operation of the flight components based on the command pilot signal generated in response to the pilot control input data.

In an example, the aircraft may include an electric aircraft that includes one or more propulsors driven by at least one electric motor supplied and controlled by an inverter as instructed by the command processor. Accordingly, as the pilot input data indicates in increase in thrust, the command processor may cause the inverter to control operation of the motor and provide power to increase power delivered from a battery or other power source of the aircraft to the motor to increase the thrust of the propulsor.

In a more particular example, the electric aircraft may include a plurality of lift propulsors as well as one or more forward or rear propulsors to drive the aircraft. The multiple motors of the electric aircraft may be driven by a flight controller and are powered through inverters, with each of the motors potentially receiving power through one or more inverters. Accordingly, the large number of inverters present on the aircraft increases to complexity of controlling power and of controlling operation of the different inverters. The inverters are connected to the command processor and/or flight controller of the electric aircraft through a controller area network (CAN) bus connection (e.g., are each connected to the CAN bus of the aircraft). The inverters receive commands from the CAN bus and act accordingly, for example as dictated by a control module of the inverter.

In the example provided, the inverter may be powered solely through a high voltage (e.g., in a range of thirty to one thousand or more volts and in some examples in a range of fifty to one thousand or more volts and in some examples in a range of one hundred to one thousand or more volts) system of the electric aircraft, and therefore does not have a low voltage (e.g., less than fifty and in some examples less than thirty volts such as a fifteen to twenty volt or in some examples approx. twelve volt system) system to separately power the inverter. Accordingly, in some examples, the inverter may receive a shutdown message across the CAN bus and power off, thereby losing an enable message. An enable message, for example, may be used to initiate or allow the inverter to start functioning and covert DC power to AC power. In some examples, the inverter may include a processor that may malfunction and due to the malfunction may not stay powered off or on as it should. Accordingly, the present description provides for a robust, secure, and efficient way to perform critical functions for a component of an electric aircraft such as to control the power state of the inverter without requiring a processor and/or software commands for the inverter to power on. The function may be protected as it may relate to an enable, reset, shutdown, or other such command for a functional component of the electric aircraft. The systems and techniques provided herein also provide for isolation of the power-on and power-off commands to the inverters separate from the control functionality provided through processors and software, such separation ensuring secure power-on and power-off transitions for the inverters of the aircraft.

The inverter includes a processor, such as a microcontroller unit (MCU) or other such processing unit that includes a hardware level reset or enable function for the inverter. The inverter further includes power supplies at a circuit board level that supply power to the processor, logic circuitry of the inverter, and drive hardware for high voltage switches. The inverter further includes a signal chain communicably connecting the processor and the switches or inverter circuitry for transmitting control signals, and for controlling the inverter (e.g., through pulse-width modulation control). The inverter may include or be coupled with a hardware circuit for controlling enable/disable functions of the inverter.

The inverter may be powered on/off based on signals from a communication bus such as the CAN bus of an electric aircraft. The inverter components, such as the processor and the hardware circuit, may be communicably connected with the communication bus. Accordingly, the processor and the hardware circuit can process communication bus messages and associated identifiers. In an embodiment, the processor is configured to process the identifiers of messages on the communication bus as well as the contents of messages conveyed on the communication bus. The processor and the hardware circuit, in coordination, can be used to process signals on the communication bus and to enable/disable functions of a functional component such as an inverter.

In an embodiment, control signals for one or more components of the inverter (or other such functional component) may be based on command signals from one or both of the processor and/or hardware circuit. In an illustrative example, to power on/off a functional component, the circuit board level components of the inverter may require a command from the hardware circuit as well as the processor before performing the operation informed by the message on the communication bus. In an illustrative example, the power on/off may be controlled by a specific sequence of commands from the hardware circuit and/or processor based on the communication bus message.

In one embodiment, to activate or power on the inverter (or other functional component), the hardware circuit may provide for powering the circuit board level components of the inverter in response to an enable command on the communication bus that is decoded by the hardware circuit, which includes providing power to the processor. The processor, now powered, may additionally require an enable command to the processor from the communication bus. In some examples, the enable command for the hardware circuit and/or processor may be a single message and/or two separate signals, or series of signals across the communication bus, for example from the flight controller of an electric aircraft. Accordingly, the operation of the inverter may be controlled through the hardware circuit (providing a power-on signal to power the processor and other components of the inverter) as well as the commands from the processor separately. The inverter or other such functional component may have a default power state (e.g., default power on or default power off). The inverter or other functional component may then be activated or deactivated from the default power state through the hardware circuit and/or processor.

In a first illustrative example, a disable signal may be conveyed across the communication bus from a flight controller or other system of the electric aircraft. The disable signal may include or be associated with a correct identifier as described herein to authenticate the message. To ensure that the inverter remains powered down, for example in the instance of a malfunctioning processor, the hardware circuit is configured to transmit a shut down or disable signal to disable power supplies to the circuit board components of the inverter. This would ensure that power is not delivered to the circuit board components and therefore the malfunctioning processor is not able to enable the inverter in a malfunctioning manner.

In a second illustrative example, in response to the disable signal described above, the hardware circuit may transmit a disable signal to one or more components in the signal processing chain between the processor and one or more high voltage switches or other such components of an inverter or other functional component. This disable signal may then cause interruption of signals from a malfunctioning processor or other component from causing the inverter to perform operations such as enable commands.

In a third illustrative example, in response to the disable signal, the hardware circuit may transmit a signal to the processor to cause a hardware-level reset of the processor. For instance, the processor may include a hardware reset or enable function that may be activated by the hardware circuit in response to the signal on the communication bus. The reset or enable function may be used to reset the processor and thereby potentially resolve the malfunctioning processor through the reset operation.

In a fourth illustrative example, in response to an enable signal on the communication bus, the hardware circuit may be configured to perform one or more operations and convey signals to other components of the system. The message may be authenticated at the hardware circuit based on a message identifier matching a pre-stored identifier to validate the message. In response to the enable signal, the hardware circuit may transmit a signal to cause power to be delivered to the circuit board components of the inverter, including the processor used to control operation of the inverter and/or functional component.

In a fifth illustrative example, in response to the enable signal described above, the hardware circuit may be configured to transmit a signal (responsive to the enable signal being authenticated) to enable one or more circuitry components of the inverter downstream of the processor (e.g., one or more components whose operation is controlled by the processor). The signal may cause power to be provided to one or more components in the signal processing flow of the inverter that results in control of the inverter by the processor.

In a sixth illustrative example, in response to the enable signal described above, the hardware circuit may be configured to release a hardware reset signal to the processor or clear a reset or disable code at the processor, thereby enabling the processor to activate and control operations of the components of the inverter.

In one embodiment, the hardware circuit may have a separate power supply, such as a low power and low voltage power supply that may be connected to a power source such as a high voltage bus of the electric aircraft for powering the hardware circuit.

In one embodiment, the inverter may be powered on and off through the use of a hardware circuit such as a programmable logic device to demodulate a CAN message including an identifier and a payload, and relay the payload to one or more components, including hardware, software, and firmware applications that require consumption of the payload. In this manner, the circuit or programmable logic device is able to filter the CAN messages to identify the signals to power on or power off the inverter and can therefore act as a sequence detection state machine to control the state of the inverter separate from the control loop and control signals of the inverter.

The hardware circuit may be used to filter CAN bus messages based on the pre-programmed stored identifier, in this manner, the hardware circuit may be used to relay the payload to either a subsequent comparator for decoding a keyed function (e.g., using public/private key cryptography) as part of a handshake function such as an encryption and/or decryption process or for consumption by a device such as the inverter for powering on/off. In some examples the multiple comparisons may be compared using Boolean comparison and in the event that both conditions are met, it would represent a successful de-keying and therefore result in a change in state of the inverter.

The hardware circuit monitors the traffic of messages on the CAN bus and compares the identifier of the messages against a stored identifier of the hardware circuit. This comparison may include a bit-wise comparison of the identifier, though in some examples, the payload may be compared against a pre-coded payload stored at the hardware circuit to ensure robustness and confidence in the power-on and power-off signals. Because the hardware circuit operates on bits and as a logic circuit rather than at a higher level, such as based on a software analysis, the operation is performed using hardware components and not software that must be strictly designed and controlled per regulations regarding software implementations on aircraft. In this manner, the processor is isolated from the decision to power-on and power-off the inverter and mitigates potential failure modes related to processor and/or software failures or bugs.

The hardware circuit may, in some examples, be designed and configured to comply or follow a standard such as a safety standard including, for example DO-254, the "Design Assurance Guidance for Airborne Electronic Hardware" developed and published by the Radio Technical Commission for Aeronautics. The standard for DO-254, or other such standards provide guidance for design, verification, and validation of airborne electronic hardware to ensure safety, reliability, and compliance with regulatory standards. In some examples, the hardware circuit may be designed such that a comprehensive combination of deterministic tests and analyses appropriate to the design assurance level for the circuit can ensure correct functional performance under all foreseeable operating conditions with no anomalous behavior. In some examples the hardware circuit may be a custom micro-coded component, including Application Specific Integrated Circuits (ASICs) and Programmable Logic Devices (PLDs), FPGA, or CPLD. In some examples, the hardware circuit may include a microprocessor-based system that is not software controlled.

In some examples, the systems and techniques described herein may be implemented in other flight components of an electric aircraft besides an inverter associated with a motor, such as an actuator configured to control a control surface of the aircraft. Other components connected to the CAN bus of the aircraft may be similarly shifted between operational states (e.g., on/off and/or other operational states such as operating in a first or second mode). The flight component may be coupled to a power system of the aircraft such as a high voltage connection to a power supply (e.g., battery) of an electric aircraft. The flight component may couple to the CAN bus (or other serial bus) of the electric aircraft.

The programmable logic device (sometimes referred to as the hardware circuit herein) is configured to receive a serial bus signal on the serial bus, and compare an identifier of the serial bus signal against a stored identifier of the flight component. In response to the identifier matching the stored identifier, the programmable logic device may cause the flight component to change from a first state to a second state. In some examples, the flight component may include a propulsor for an electric aircraft including a motor and an inverter configured to provide power to drive the motor. The inverter may include a high voltage connection between a power supply of the electric aircraft and the inverter and the hardware circuit connected to a serial bus of the electric aircraft.

In some examples the first state may include a power-off state the second state may include a power-on state. When the flight component is in the second state, a processor of the inverter may be configured to control operation of the inverter in response to the signals from the flight controller. The hardware circuit may include a programmable logic device and/or include a shift register and a comparator. The serial bus signal may include a series of messages, and the hardware circuit being configured to compare the identifier against the stored identifier may include comparing a first identifier of a first message of the series of messages against at least a first portion of the stored identifier and comparing a second identifier of a second message of the series of messages against at least a second portion of the stored identifier. The hardware circuit being configured to cause the flight component to change from the first state to the second state may include enabling the power supply of the electric aircraft to provide power to the flight component in the second state, where the flight component is controllable in the second state by a flight computer of the electric aircraft. The serial bus signal may include a first signal from a first flight controller and a second signal from a second flight controller.

The systems and techniques described herein provide for state transitions of various components, such as processors of different flight components between states such as between an operating and non-operating state. Accordingly, the present description provides for a robust, secure, and efficient way to control the power state of the flight component without requiring a processor and/or software commands for the flight component to power on. The systems and techniques provided herein also provide for isolation of the power-on and power-off commands to the components separate from the control functionality provided through processors and software, such separation ensuring secure power-on and power-off transitions for the components of the aircraft.

Because the hardware circuit operates on bits and as a logic circuit rather than at a higher level, such as based on a software analysis on a protocol level, the operation is performed using hardware components and not software that must be strictly designed and controlled per regulations regarding software implementations on aircraft. In this manner, the processor and corresponding software are isolated from the decision to power-on and power-off the inverter and mitigates potential failure modes related to processor and/or software failures or bugs.

Turning now to the figures, FIG. 1 depicts an example of an electric aircraft 100 implementing a serial bus authentication system for flight components, according to at least one example. The electric aircraft 100 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources, to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generates lift and propulsion by way of one or more powered rotors connected with an engine, such as a multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

The electric aircraft 100 includes a fuselage 102 with wings 104 extending from the fuselage 102. The wings 104 may include airfoil shapes and support booms 106 that extend along a direction parallel with a length of the fuselage 102 and include lift propulsors 108 to provide lift and propulsion for the electric aircraft. The electric aircraft 100 also includes a propulsor 110 for forward propulsion as well as stabilizers 112. The wings 104 and stabilizers 112 may provide control surfaces for controlling the attitude of the fuselage 102 during flight.

Propulsors 108 provide vertical propulsion (e.g.). Propulsor 110 may be positioned at a rear of the fuselage 102 and propel the aircraft forward. A lift propulsor is a propulsor 108 that generates lift to propel the aircraft in an upward direction; one of more lift propulsors may be mounted on the front, on the wings 104, at the rear, and/or any suitable location. A propulsor 108, as used herein, is any component or device used to propel a craft by exerting force on a fluid medium, which may include a gaseous medium such as air or a liquid medium such as water. At least a lift propulsor is a propulsor 108 that generates a substantially downward thrust, tending to propel the electric aircraft 100 in a vertical direction providing thrust for maneuvers such as without limitation, vertical take-off, vertical landing, hovering, and/or rotor-based flight, or similar styles of flight.

While shown as a single propulsor at the rear, the propulsor 110 is for propelling an aircraft in a forward direction and may include one or more propulsors mounted on the front, on the wings, at the rear, or a combination of any such positions. At least a forward propulsor may propel the electric aircraft 100 forward for fixed-wing and/or "airplane"-style flight, takeoff, and/or landing, and/or may propel the electric aircraft 100 forward or backward on the ground. The propulsors 108 and the propulsor 110 include a thrust element that may include any device or component that converts the mechanical energy of a motor, for instance in the form of rotational motion of a shaft, into thrust in a fluid medium. The thrust element may include, without limitation, a device using moving or rotating foils, including without limitation one or more rotors, an airscrew or propeller, a set of airscrews or propellers such as contrarotating propellers, a moving or flapping wing, or the like. The thrust element may include, in some examples, a marine propeller or screw, an impeller, a turbine, a pump-jet, a paddle or paddle-based device, or the like.

Propulsors 108 and propulsor 110 may include at least a motor 116 mechanically connected the thrust element. The motor 116 may include without limitation, any electric motor, where an electric motor is a device that converts electrical energy into mechanical energy, for instance by causing a shaft to rotate. The motor 116 may be driven by direct current (DC) electric power; for instance, at least a first motor may include a brushed DC at least a first motor, or the like. The motor 116 may also be driven by electric power having varied, or reversing, voltage levels such as alternating current (AC) power as produced by an alternating current generator and/or inverter 118, or otherwise varying power, such as produced by a switching power source. The propulsors 108 and the propulsor 110 may be connected to a controller area network (CAN) bus 114. The CAN bus 114 enables the control units of the propulsors to communicate with a flight controller 122 as well as with the other propulsors and/or other components connected to the CAN bus 114.

The CAN bus 114 may include a serial bus, or other form of serial communication bus or channel that may be implemented on the electric aircraft 100. Though some examples and embodiments herein are described with respect to a CAN bus, the CAN bus 114 may be replaced in some examples or embodiments with a different communication channel. The CAN bus 114 may enable communications across a number of inverters 118 without needing separate wiring harnesses for each inverter 118 for communications. The CAN bus 114 uses a message-based protocol designed for multiplex wiring within vehicles to save on complexity and wiring harness complexity. Furthermore, the CAN bus 114 may reduce the weight of the electric aircraft 100 by preventing the need of individual wiring harnesses for each inverter 118.

As shown in FIG. 1, the propulsor 108 includes a motor 116 powered by an inverter 118 that includes a programmable logic device 120 for state control of the inverter 118. The programmable logic device 120 may include a field programmable gate array (FPGA), programmable logic device (PLD), or other such components that form a digital circuit. The inverter 118 may change state, such as to power on/off or enable/disable through the use of the programmable logic device 120. The programmable logic device 120 uses programmable logic to demodulate a CAN message on the CAN bus 114, the message including an identifier and a payload, and relay the payload to one or more components such as the inverter 118. In this manner, the programmable logic device 120 is able to filter the CAN messages to identify the signals to power on or power off the inverter 118 and can therefore act as a state machine to control the state of the inverter 118 separate from the control signals of the inverter. In particular, the state machine may be a sequence detection state machine where the state of the inverter 118 is in response to a sequence on the serial bus of the electric aircraft 100 separate from control signals for the inverter 118.

The programmable logic device 120 may include a dedicated circuit device that may be used to filter CAN bus messages based on the pre-programmed stored identifier, in this manner, the programmable logic device 120 may be used to relay the payload to either a subsequent comparator for decoding a keyed function as part of a handshake function or for consumption by the inverter 118 for powering on/off. In some examples the multiple comparisons may be compared using Boolean comparison and in the event that both conditions are met, it would represent a successful de-keying and therefore result in a change in state of the inverter.

The programmable logic device 120 monitors the traffic of messages on the CAN bus and compares the identifier of the messages against a stored identifier of the programmable logic device 120. This comparison may include a bit-wise comparison of the identifier, though in some examples, the payload may be compared against a pre-coded payload stored at the hardware circuit to ensure robustness and confidence in the power-on and power-off signals. Because the programmable logic device 120 operates on bits and as a logic circuit rather than at a higher level, such as based on a software analysis, the operation is performed using hardware components and not software that must be strictly designed and controlled per regulations regarding software implementations on aircraft. In this manner, the processor is isolated from the decision to power-on and power-off the inverter and mitigates potential failure modes related to processor and/or software failures or bugs.

The programmable logic device 120 performs sequence detection on the CAN messages to identify one or more messages (e.g., including a particular sequence of messages such as an ordered sequence of messages) to then cause the state of the inverter 118 to change. The inverter 118 may change from powered off with no power flowing to the motor 116 to a powered-on state where power flows from the battery or energy source of the electric aircraft 100 to the motor 116 through the inverter 118. The inverter may be controlled by a flight controller 122 over the CAN bus once enabled using the programmable logic device 120. The programmable logic device 120 may likewise be used to perform a shutdown of the inverter 118 separate from a signal from a processor of the inverter.

In some examples, programmable logic device 120 may shift the state of the inverter 118 between operational states (e.g., on/off and/or other operational states such as operating in a first or second mode, like a vertical or horizontal flight mode). The inverter 118 is coupled to a power system of the aircraft such as a high voltage connection to a power supply (e.g., battery) of an electric aircraft. In some examples the first state may include a power-off state the second state may include a power-on state. When the inverter 118 is in the second state, a processor of the inverter 118, such as an electronic control unit (ECU), may be configured to control operation of the inverter 118 in response to the signals from the flight controller 122.

In some examples, the programmable logic device 120 may include a programmable logic device and/or include a shift register and a comparator. The serial bus signal may carry a series of messages from the flight controller. The programmable logic device 120 may compare the identifier against the stored identifier may include comparing a first identifier of a first message of the series of messages against at least a first portion of the stored identifier and comparing a second identifier of a second message of the series of messages against at least a second portion of the stored identifier. The programmable logic device 120 may be configured to cause the inverter 118 to change from the first state to the second state may include enabling the power supply of the electric aircraft 100 to provide power to the inverter 118 in the second state. The inverter 118 may be controllable in the second state by the flight controller 122. In some examples, the flight controller 122 may include multiple separate flight controllers to provide additional redundancy and robustness to the system.

The inverter 118 may include various components such as a processor (e.g., a microcontroller unit (MCU)) or other such processing unit that includes a hardware level reset or enable function for the inverter 118. The inverter 118 further includes circuit board level components (that may include the processor and other control circuitry for signal processing and controlling operation of switches or other components of the inverter 118), logic circuitry of the inverter 118, and drive hardware for high voltage switches of the inverter 118.

The inverter 118 may be powered on/off based on signals from the CAN bus 114. The inverter components, such as the processor and the programmable logic device 120, may be communicably connected with the CAN bus 114. Accordingly, the processor and the programmable logic device 120 can process CAN bus messages and associated identifiers. The messages may be authenticated as described herein and the processor and the hardware circuit, in coordination, can be used to process signals on the CAN bus 114 and to enable/disable functions of the inverter 118.

In an embodiment, control signals for one or more components of the inverter 118 (or other such functional component) may be based on command signals from one or both of the processor of the inverter 118 and/or the programmable logic device 120. For instance, to power on/off the inverter 118, the circuit board level components may receive enable signals from the programmable logic device 120 as well as the processor before performing an operation informed by the message on the CAN bus 114. In some examples, the power on/off may be controlled by a specific sequence of commands from the programmable logic device 120 and/or processor based on the messages across the CAN bus 114.

For example, to activate or power on the inverter 118, the programmable logic device 120 may provide for powering the components of the inverter 118 in response to an enable command on the CAN bus 114 that is decoded by the programmable logic device 120, which includes providing power to the processor. The processor, now powered, may additionally require an enable command to the processor from the CAN bus 114. In some examples, the enable command for the programmable logic device 120 and/or processor may be a single message and/or two separate signals, or series of signals across the CAN bus 114, for example from the flight controller 122. Accordingly, the operation of the inverter 118 may be controlled through the programmable logic device 120 (providing a power-on signal to power the processor and other components of the inverter 118) as well as the commands from the processor separately. The inverter 118 or other such functional component of the electric aircraft 100 may have a default power state (e.g., default power on or default power off). The inverter 118 or other functional component may then be activated or deactivated from the default power state through the programmable logic device 120 and/or processor.

Figure 2:
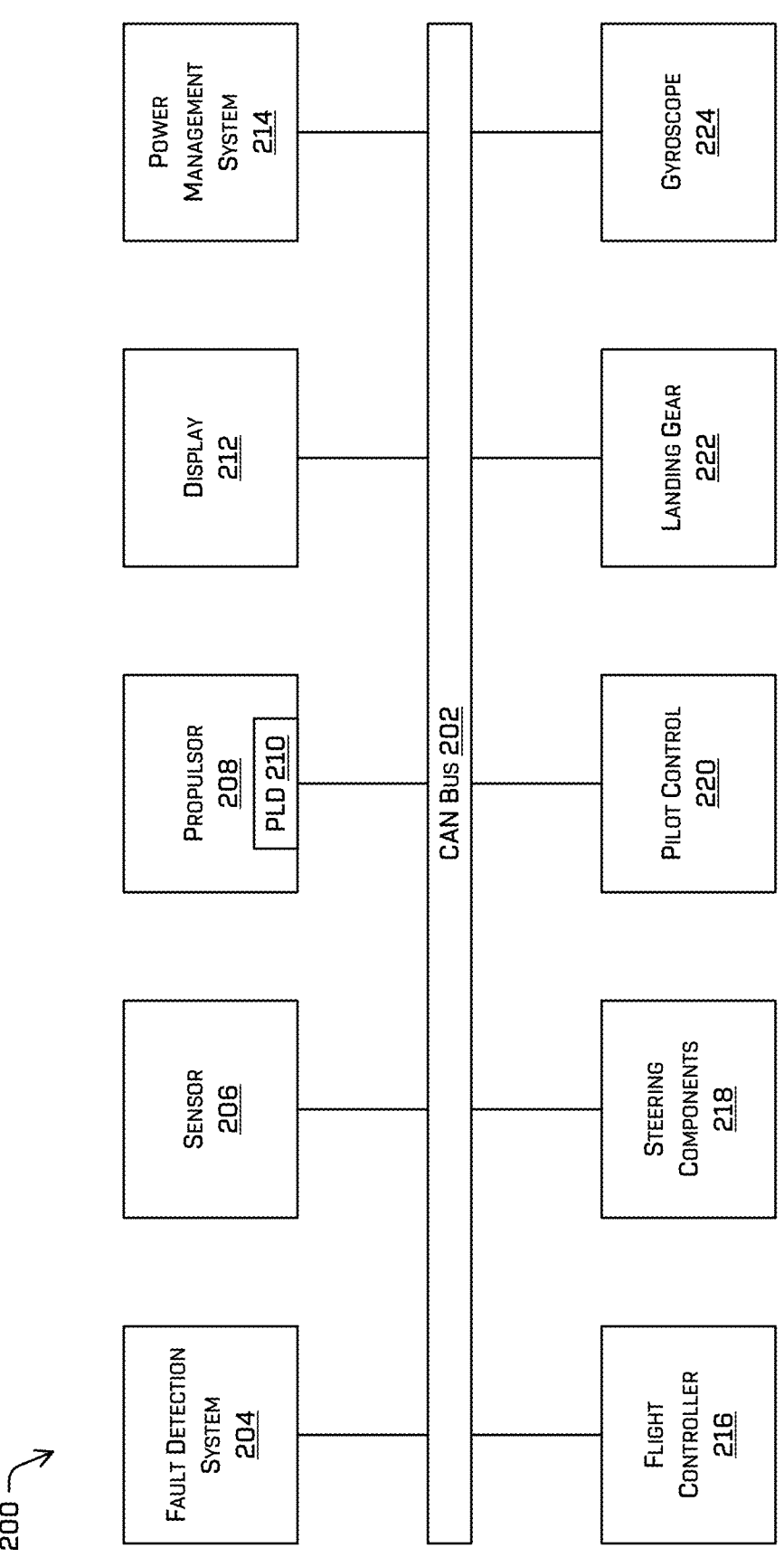
FIG. 2 depicts an example architecture of a controller area network (CAN) bus system of an electric aircraft, according to at least one example.

FIG. 2 depicts an example architecture 200 of a controller area network (CAN) bus 202 system of an electric aircraft, according to at least one example. The CAN bus 202 may include any bus system such as any serial bus system used for communications on the electric aircraft 100. The CAN bus 202 is a physical vehicle bus unit including a central processing unit (CPU), a CAN controller, and a transceiver designed to allow devices to communicate with each other's applications without the need of a host computer which is located physically at electric aircraft 100. CAN bus 202 may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus 202 components and/or constituent parts as described in further detail below. CAN bus 202 may include multiplex electrical wiring for transmission of multiplexed signaling. CAN bus 202 may include message-based protocol(s), wherein the invoking program sends a message to a process and relies on that process and its supporting infrastructure to then select and run appropriate programing.

In some examples, the electric aircraft may include a plurality of CAN bus 202 which may be an example of the CAN bus 114 of FIG. 1 and may be mechanically connected to the electric aircraft 100. The hardware of the CAN bus 202 is integrated within the infrastructure of the electric aircraft 100. CAN bus 202 may be communicatively connected to the electric aircraft 100 and/or with a plurality of devices outside of the electric aircraft as well. In some examples, the electric aircraft may include multiple CAN bus systems that connect to the various components of the electric aircraft 100.

The CAN bus 202 may avoid the need for large, multi-core wiring harnesses used in eVTOL aircraft. The CAN bus 202 speed my may reach 1 Mbit/sec, which may be achieved with a bus length of up to 40 meters when using a twisted wire pair for communication. The CAN bus 202 is terminated at each end, typically using a resistor of 120 Ohms. For lengths longer than 40 meters the bus speed is reduced, for instance, 1000-meter bus may be achieved with a 50 Kbit/sec bus speed.

The electric aircraft 100 may include components such as a fault detection system 204, sensor 206, propulsor 208, programmable logic device 210, display 212, power management system 214, flight controller 216, steering components 218, pilot control 220, landing gear 222, gyroscope 224, and other such components that may couple to the CAN bus 202.

The fault detection system 204 may include one or more sensors 206 and components to detect, identify, and generate alerts with respect to one or more faults of the electric aircraft 100.

The electric aircraft 100 may include a plurality of sensors 206 that connect with CAN interfaces to the CAN bus 202 to transmit measured state data. For instance, and without limitation, the CAN bus units may transmit measured state data from at least a sensor 206 communicatively connected to at least a pilot control 220. Measured state data originating from sensors 206 may include electrical, electromagnetic, visual, audio, radio waves, or another undisclosed signal type alone or in combination. At least a sensor 206 communicatively connected to at least a pilot control 220 may include one or more sensors disposed on, near, around or within at least pilot control 220.

The pilot control 220 may include a throttle lever, inceptor stick, collective pitch control, steering wheel, brake pedals, pedal controls, toggles, joystick. At least a sensor 206 may include a motion sensor to detect spinning, rotating, oscillating, gyrating, jumping, sliding, reciprocating, or the like of various flight components. The sensor 206 may include, torque sensor, gyroscope 224, accelerometer, torque sensor, magnetometer, inertial measurement unit (IMU), pressure sensor, force sensor, proximity sensor, displacement sensor, vibration sensor, Hall sensor, among others.

In some examples, sensor 206 may include a sensor suite which may include a plurality of sensors 206 that may detect similar or unique phenomena. For example, in a non-limiting embodiments, sensor suite may include a plurality of accelerometers, a combination of accelerometers and gyroscopes, or a combination of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

The propulsor 208 may include components such as the motor 116 and inverter 118 as described above with respect to FIG. 1 and the programmable logic device 210 may include the programmable logic device 120 of FIG. 1. The motor may include without limitation, any electric motor, where an electric motor is a device that converts electrical energy into mechanical energy, for instance by causing a shaft to rotate. The motor may be driven by direct current (DC) electric power; for instance, at least a first motor may include a brushed DC at least a first motor, or the like. The motor may also be driven by electric power having varied, or reversing, voltage levels such as alternating current (AC) power as produced by an alternating current generator and/or inverter, or otherwise varying power, such as produced by a switching power source. The propulsor 208 is connected to the CAN bus 202 that enables communication between various components of the electric aircraft 100. In some examples, the CAN bus 202 enables cross-communication between multiple propulsors that enables a first propulsor to cause a second propulsor (and/or inverter) to change operations and/or communicate to the programmable logic device 210 to cause one or more propulsors 208 to change states.

The programmable logic device 210 forms a digital circuit to change state of the propulsor 208, such as to power on/off through the use of the programmable logic device 210. The programmable logic device 210 uses programmable logic to demodulate CAN messages on the CAN bus 202, the message including an identifier and a payload, and relay the payload to one or more components such as the inverter of propulsor 208. In this manner, the programmable logic device 210 is able to filter the CAN messages to identify the signals to power on or power off the inverter of propulsor 208 and can therefore act as a state machine to control the state of the propulsor 208 separate from the control signals and in response to a sequence on the serial bus, thereby forming a sequence detection state machine.

The programmable logic device 210 may be used to filter CAN bus messages based on the pre-programmed stored identifier, in this manner, the programmable logic device 210 may be used to relay the payload to either a subsequent comparator for decoding a keyed function as part of a handshake function or for consumption by the propulsor 208 for powering on/off. In some examples the multiple comparisons may be compared using Boolean comparison and in the event that both conditions are met, it would represent a successful de-keying and therefore result in a change in state of the inverter.

Figure 3:
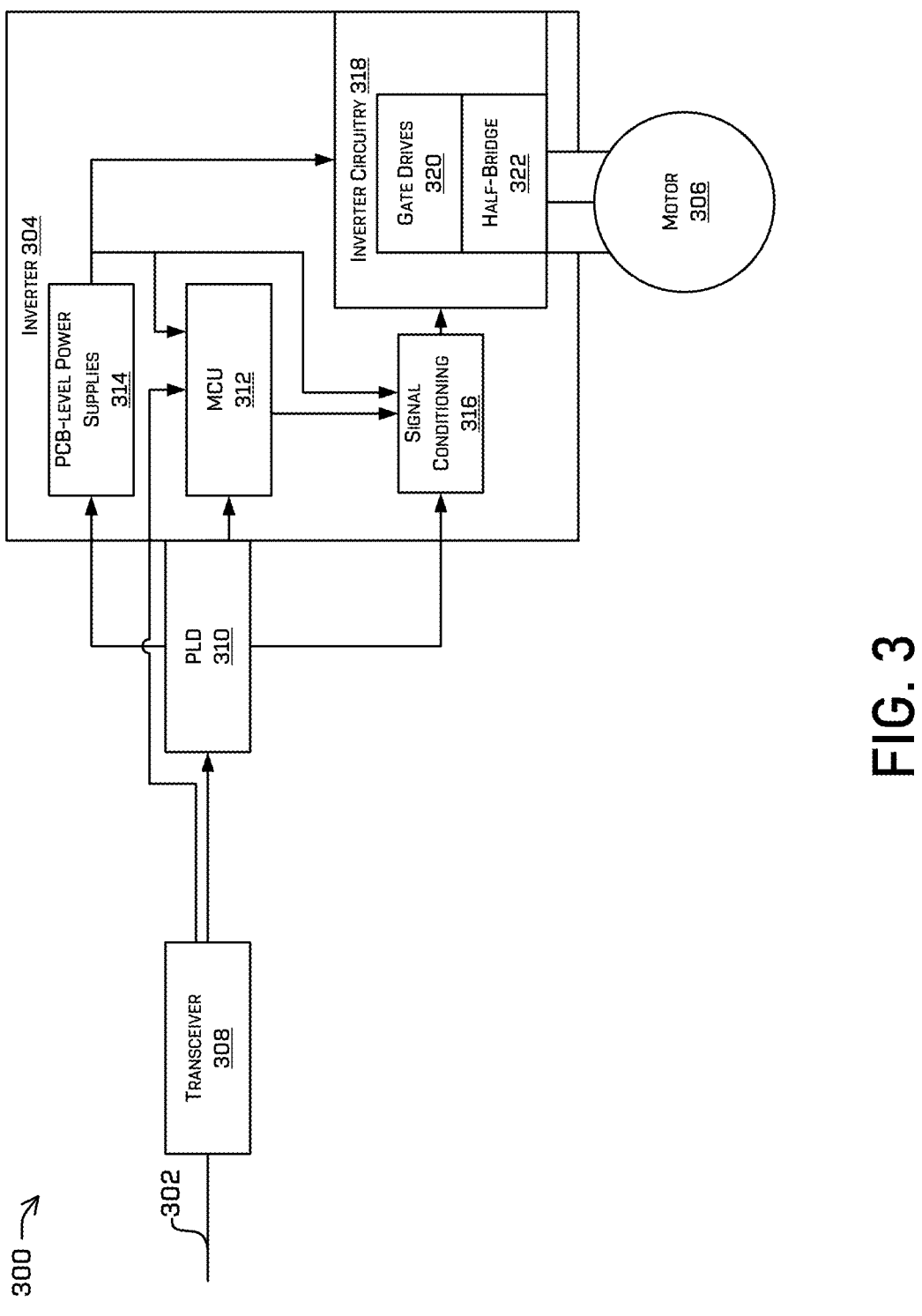
FIG. 3 depicts an example architecture for enabling an inverter as part of a system using a hardware circuit based on signals from a communication bus, according to at least one example.

FIG. 3 depicts an example architecture for enabling an inverter 304 as part of a system 300 using a programmable logic device 310 based on signals from a communication bus 302, according to at least one example. The system 300 includes a communication bus 302 such as a CAN bus or other communication bus of an electric aircraft or other such system and an inverter 304 for causing operation of a motor 306 or other functional component of the electric aircraft. The communication bus 302 may include or be connected with a transceiver 308 the drive and detect data to and from the communication bus 302 and therefore provides and interface between the inverter 304, the programmable logic device 310, and the communication bus 302. Though described herein with respect to the inverter 304 and the motor 306, the system 300 may be implemented with other functional components of a system, for example providing for enabling and disabling operation of the functional components. In an embodiment, the system 300 may be implemented in an electric aircraft 100 that includes a propulsor. The propulsor includes the motor 306 which may include without limitation, any electric motor, where an electric motor is a device that converts electrical energy into mechanical energy, for instance by causing a shaft to rotate. The motor 306 may be driven by direct current (DC) electric power; for instance, the motor 306 may include a brushed DC motor or the like. The motor 306 may be driven by electric power having varying or reversing voltage levels, such as alternating current (AC) power as produced by an alternating current generator and/or inverter 304, or otherwise varying power, such as produced by a switching power source. The motor 306 may include, without limitation, a brushless DC electric motor, a permanent magnet synchronous motor, a switched reluctance motor, and/or an induction motor.

In addition to inverter 304 and/or switching power source, a circuit driving the motor 306 may include electronic speed controllers (not shown) or other components for regulating motor speed, rotation direction, torque, and/or dynamic braking. The inverter 304 may include inverter circuitry 318, gate drives 320, and half-bridge 322 for providing power and regulating motor speed of the motor 306. The inverter circuitry 318 may include components such as the gate drives 320 and half-bridges 322 that enable power delivery to the motor 306.

The inverter 304 is connected to a programmable logic device 310 such as the programmable logic device described herein. The programmable logic device described herein provides a hardware circuit to consume messages from the communication bus 302 and provide an enable or disable command based on receiving and authenticating the messages from the communication bus 302.

The inverter 304 includes a microcontroller unit 312 or other processor for controlling operations of the components of the inverter 304. The inverter 304 also includes powered-circuit board level power supplies 314 that receive power from a power source and supply power to components of the inverter 304. The power is supplied to signal conditioning components 316 and inverter circuitry 318 as may be included within an inverter 304. The microcontroller unit 312 or other such processing unit includes a hardware level reset or enable function.

The motor 306 may be connected to a thrust element. The thrust element may include any device or component that converts the mechanical energy of the motor 306, for instance in the form of rotational motion of a shaft, into thrust in a fluid medium. The thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. The thrust element may include without limitation a marine propeller or screw, an impeller, a turbine, a pump-jet, a paddle or paddle-based device, or the like. The thrust element may include a rotor.

In operation, the inverter 304 and/or motor 306 may be powered on/off based on signals from the communication bus 302. Accordingly, the programmable logic device 310 and the microcontroller unit 312 can process communication bus messages and associated identifiers. The microcontroller unit 312 is configured to process the messages on the communication bus 302 and, in coordination with the programmable logic device 310 can be used to process signals on the communication bus 302 and to enable/disable functions of the inverter 304 or other such functional components.

In an embodiment, control signals for one or more components of the inverter 304, such as signals from the programmable logic device 310 and/or the microcontroller unit 312 as depicted in the system 300, may be provided to the powered circuit board level power supplies 314, signal conditioning 316, and/or inverter circuitry 318 may be communicated when the programmable logic device 310 and/or microcontroller unit 312 authenticates the message on the communication bus 302. To power on/off the inverter 304, the microcontroller unit 312, powered circuit board level power supplies 314, signal conditioning 316, and/or inverter circuitry 318 may require a command from the programmable logic device 310 and/or the microcontroller unit 312 before performing the operation informed by the message on the communication bus 302. In an illustrative example, the power on/off may be controlled by a specific sequence of commands from the programmable logic device 310 and/or microcontroller unit 312 based on the communication bus message.

In the system 300, to activate or power on the inverter 304, the programmable logic device 310 provides for powering the circuit board level components of the inverter 304 in response to an enable command on the communication bus 302 that is decoded and authenticated by the programmable logic device 310, which may include providing power to the microcontroller unit 312. The microcontroller unit 312, when powered, may additionally require an enable command from the communication bus 302. The enable command for the programmable logic device 310 and/or the microcontroller unit 312 may be a single message and/or two separate signals, or series of signals across the communication bus 302, for example from the flight controller of an electric aircraft. The inverter 304 may have a default power state (e.g., default power on or default power off). In an example, the default power state may be powered on for flights such that the system components are default enabled during flight. The inverter 304 may then be activated or deactivated from the default power state through the hardware circuit and/or processor.

To disable the inverter 304, a disable signal may be conveyed across the communication bus 302 from a flight controller or other system of the electric aircraft. The disable signal may include or be associated with an identifier as described herein to authenticate the message. To ensure that the inverter 304 remains powered down, for example in the instance of a malfunctioning processor, the programmable logic device 310 is configured to transmit a shut down or disable signal to disable power supply to the components of the inverter 304. This would ensure that power is not delivered to the components and therefore the malfunctioning processor is not able to enable the inverter 304 when malfunctioning. The programmable logic device 310 may also transmit a disable signal to one or more components in the signal processing chain (e.g., in the signal conditioning 316 and/or inverter circuitry 318 between the microcontroller unit 312 and one or more high voltage switches such as the gate drives 320 and/or half-bridge 322. This disable signal may then cause interruption of signals from a malfunctioning processor or other component from causing the inverter 304 to perform operations such as enable commands. The programmable logic device 310 may also transmit a signal to cause a hardware-level reset of the microcontroller unit 312. For instance, the microcontroller unit 312 may include a hardware reset or enable function that may be activated by the programmable logic device 310 in response to the signal on the communication bus 302. The reset or enable function may be used to reset the microcontroller unit 312 and thereby potentially resolve the malfunctioning processor through the reset operation.

To enable the inverter, in response to an enable signal on the communication bus 302, the programmable logic device 310 may be configured to perform one or more operations and convey signals to other components of the system 300. The message may be authenticated at the programmable logic device 310 based on a message identifier matching a pre-stored identifier to validate the message. In response to the enable signal, the programmable logic device 310 may transmit a signal to cause power to be delivered to the components of the inverter 304, including the microcontroller unit 312 used to control operation of the inverter 304. In response to the enable signal described above, the programmable logic device 310 may be configured to transmit a signal (responsive to the enable signal being authenticated) to enable one or more components of the inverter 304 downstream of the microcontroller unit 312 (e.g., the signal conditioning 316 and/or inverter circuitry 318). The signal may cause power to be provided to one or more components in the signal processing flow of the inverter 304 that results in control of the inverter 304 by the microcontroller unit 312. In response to the enable signal described above, the programmable logic device 310 may be configured to release a hardware reset signal to the microcontroller unit 312 or clear a reset or disable code at the microcontroller unit 312, thereby enabling the microcontroller unit 312 to activate and control operations of the components of the inverter 304. The programmable logic device 310 may have a separate power supply, such as a low power and low voltage power supply that may be connected to a power source such as a high voltage bus of the electric aircraft for powering the programmable logic device 310.

Figure 4:
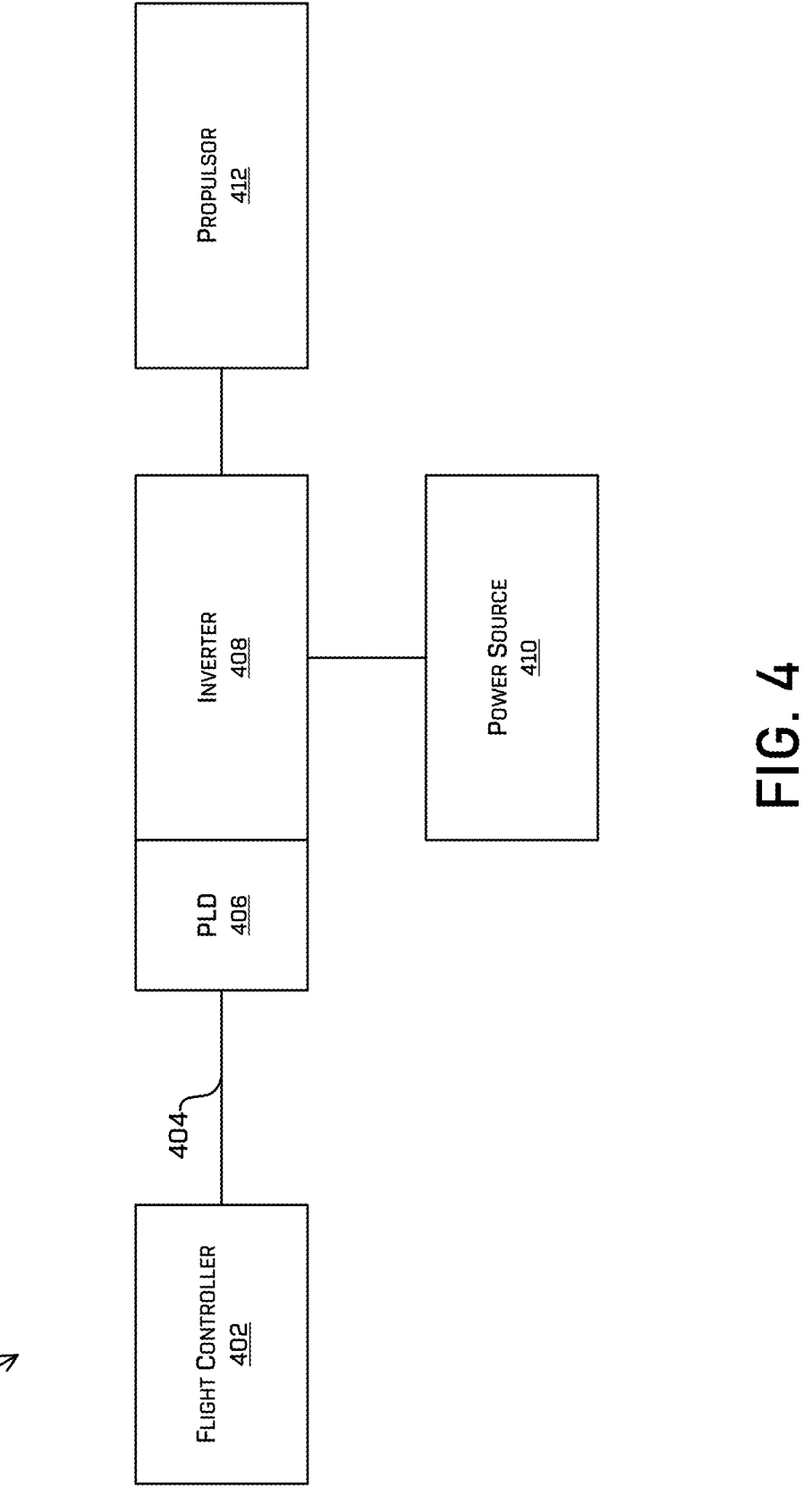
FIG. 4 depicts a block diagram of a hardware circuit for enabling an inverter of a propulsor based on signals on a serial bus of an electric aircraft, according to at least one example.

FIG. 4 depicts a block diagram of a system 400 for an electric aircraft that includes a programmable logic device for enabling an inverter 408 of a propulsor based on signals on a serial bus 404 of an electric aircraft, according to at least one example. The system 400 may represent a portion of a system within an electric aircraft 100. The programmable logic device 406 may be similar or identical to the programmable logic device 120 and/or programmable logic device 210 described herein. The system 400 includes a flight controller 402 that provides commands to one or more components of the electric aircraft 100 and also conveys signals to turn on/off various components. The block diagram 300 illustrates a single system having a single programmable logic device 406, however in an electric aircraft, multiple systems of the electric aircraft may be enabled with a programmable logic device 406 as described herein. Additionally, in some instances, the inverter 408 or other such components may include multiple programmable logic devices 406 capable of controlling the state (e.g., power-on and power-off) of the inverter 408 and/or cross-channel control of other system components (e.g., control of a second inverter by the programmable logic device 406 across the serial bus 404).

In the example of FIG. 4, the flight component illustrated includes a propulsor 412 such as a motor coupled to a propeller or other such component to provide propulsion to the electric aircraft 100. The propulsor 412 may be similar and/or identical to the propulsor 108 and/or propulsor 110 of FIG. 1. The propulsor 412 may include a motor and a propeller or other airfoil surface and/or other system for controlling flight of the electric aircraft. For example, the inverter 408 may be used to provide power to various types of electrically powered thrusters of the electric aircraft. Propulsor 412 may include at least a motor mechanically connected to a thrust element. The motor may include without limitation, any electric motor, where an electric motor is a device that converts electrical energy into mechanical energy, for instance by causing a shaft to rotate. The motor may be driven by direct current (DC) electric power; for instance, at least a first motor may include a brushed DC at least a first motor, or the like. The motor may also be driven by electric power having varied, or reversing, voltage levels such as alternating current (AC) power as produced by an alternating current generator and/or inverter 408, or otherwise varying power, such as produced by a switching power source. Accordingly, the inverter 408 receives power from the power source 410 such as a battery system or generator system of the electric aircraft and outputs power to the propulsor 412, such as an AC power signal to control operation of the propulsor 412 based on an output signal from the flight controller 402.

In some examples, the block diagram 300 may be illustrative of other systems implementing a programmable logic device 406 such as flight control systems, actuators for control surfaces (e.g., ailerons and flaps), landing gear, or other systems of the electric aircraft. The programmable logic device 406 may therefore function as a state machine to control state transitions of a connected system, the inverter 408 and propulsor 412 as illustrated in FIG. 4.

In the block diagram 300, the flight controller 402 communicates with the inverter 408 over a serial bus 404. The serial bus 404 may include any bus communication system for the electric aircraft such as a CAN bus or other such communication bus. The serial bus 404 is capable of communications such that all nodes on the serial bus are able to transmit and several may request or "listen" to the serial bus 404 simultaneously. The serial bus 404, for the purposes of this description is a specialized internal communications network for a vehicle, configured to allow a controller to communicate with other components in the vehicle without the need for a host computer.

The inverter 408 includes a programmable logic device 406 that is used to control the state of the inverter 408 based on messages conveyed across the serial bus 404. In a first state, the inverter 408 may be powered-on to provide power from a power source 410 to the propulsor 412. In a second state, the inverter may be powered-off and not provide power from the power source 410 to the propulsor 412. The inverter 408 may be powered on and off through the use of the programmable logic device 406 to demodulate a serial bus message on the serial bus 404 including an identifier and a payload, and relay the payload to one or more components such as the inverter 408. In this manner, the programmable logic device 406 is able to filter the serial bus messages to identify the signals to power on or power off the inverter and can therefore act as a state machine to control the state of the inverter 408 (e.g., on/off) separate from the control loop and control signals of the inverter 408 for powering the propulsor 412. In this manner, the commands to the inverter 408 to control the propulsor 412 vary the speed and/or thrust of the propulsor 412 but only the signal decoded by the programmable logic device 406 is capable of changing the state of the inverter 408, such that the programmable logic device 406 is the only system capable of turning the inverter 408 on and off.

The programmable logic device 406 may be used to filter serial bus messages based on a pre-programmed stored identifier, in this manner, the programmable logic device may be used to relay the payload to either a subsequent comparator for decoding a keyed function as part of a handshake function or for consumption by a device such as the inverter 408 for powering on/off. In some examples the multiple comparisons may be compared using Boolean comparison and in the event that both conditions are met, it would represent a successful de-keying and therefore result in a change in state of the inverter 408.

The programmable logic device 406 monitors the traffic of messages on the serial bus 404 and compares the identifier of the messages against a stored identifier at the program-mable logic device 406. This comparison may include a bit-wise comparison of the identifier, though in some examples, the payload may be compared against a pre-coded payload stored at the hardware circuit to ensure robustness and confidence in the power-on and power-off signals. Because the programmable logic device 406 operates on bits and as a logic circuit rather than at a higher level, such as based on a software analysis, the operation is performed using hardware components and not software that must be strictly designed and controlled per regulations regarding software implementations on aircraft. In this manner, the processor is isolated from the decision to power-on and power-off the inverter and mitigates potential failure modes related to processor and/or software failures or bugs.

In some examples, the programmable logic device 406 includes a hardware circuit such as an FPGA or other such hardware device. In some examples, the programmable logic device 406 may include an application specific integrated circuit (ASIC) or other such device.

The programmable logic device 406 performs sequence detection on the serial bus messages to identify one or more messages (e.g., including a particular sequence of messages such as an ordered sequence of messages) to then cause the state of the inverter 408 to change. The inverter 408 may change from powered off with no power flowing to the motor of the propulsor 412 to a powered-on state where power flows from the battery or energy source of the electric aircraft to the motor of propulsor 412 through the inverter 408. The inverter may be controlled by a flight controller 402 over the serial bus 404 once enabled using the program-mable logic device 406. The programmable logic device 406 may also be used to shutdown inverter 408 separate from a signal from a processor of the inverter 408 in response to a control signal from the flight controller 402.

The programmable logic device 406 may provide several benefits to the system shown in FIG. 4, including a reduction in complexity, particularly with respect to complexity of software implementations to control the state of the inverter 408. The programmable logic device 406 uses hardware electronics to perform the comparisons described herein and therefore does not require a software package to act as the serial bus filter and/or to provide security for operations such as power on/off, reset, etc. for the inverter 408 and/or propulsor 412. The programmable logic device 406 is capable of filtering through the traffic on the serial bus 404 as it is received using an arbitration identifier. This identifier allows the programmable logic device 406 to only handle messages associated with the identifier. The arbitration iden-tifier allows the programmable logic device 406 to demodu-late a serial bus message from the serial bus 404 and then may also relay the payload of the message to a bit com-parator for decoding a keyed function. The keyed function may be protected as it may relate to an enable, disable, reset, shutdown, or other such command for a functional compo-nent of the electric aircraft.

The programmable logic device may include a hardware circuit, such as described herein, to perform the operations described herein. The programmable logic device 406 may, in some examples, be designed and configured to comply or follow a standard such as a safety standard including, for example DO-254, the "Design Assurance Guidance for Airborne Electronic Hardware" developed and published by the Radio Technical Commission for Aeronautics. The stan-dard for DO-254, or other such standards provide guidance for design, verification, and validation of airborne electronic hardware to ensure safety, reliability, and compliance with regulatory standards. In some examples, the programmable logic device 406 may be designed such that a comprehensive combination of deterministic tests and analyses appropriate to the design assurance level for the circuit can ensure correct functional performance under all foreseeable oper-ating conditions with no anomalous behavior. In some examples the programmable logic device 406 may be a custom micro-coded component, including Application Spe-cific Integrated Circuits (ASICs) and Programmable Logic Devices (PLDs), FPGA, or CPLD. In some examples, the programmable logic device 406 may include a micropro-cessor-based system that is not software controlled.

In some examples, the programmable logic device 406 includes a first comparator for comparing an identifier of a serial bus message against a stored identifier at the program-mable logic device. This first comparator may include a bit-wise comparison of the identifier against the identifier section of the message on the serial bus. The payload from the message (e.g., the portion related to the function to be performed) may then be sent to a second comparator that performs a bit-wise comparison of the payload data sequence against a pre-coded bit. If the first comparator and the second comparator return TRUE states (e.g., TRUE AND TRUE) then the programmable logic device 406 passes on the message payload to perform the function. In the event that one or both of the comparators do not return the TRUE result, then no action is taken and the function is not performed (e.g., no change in state of the inverter 408).

Figure 5:
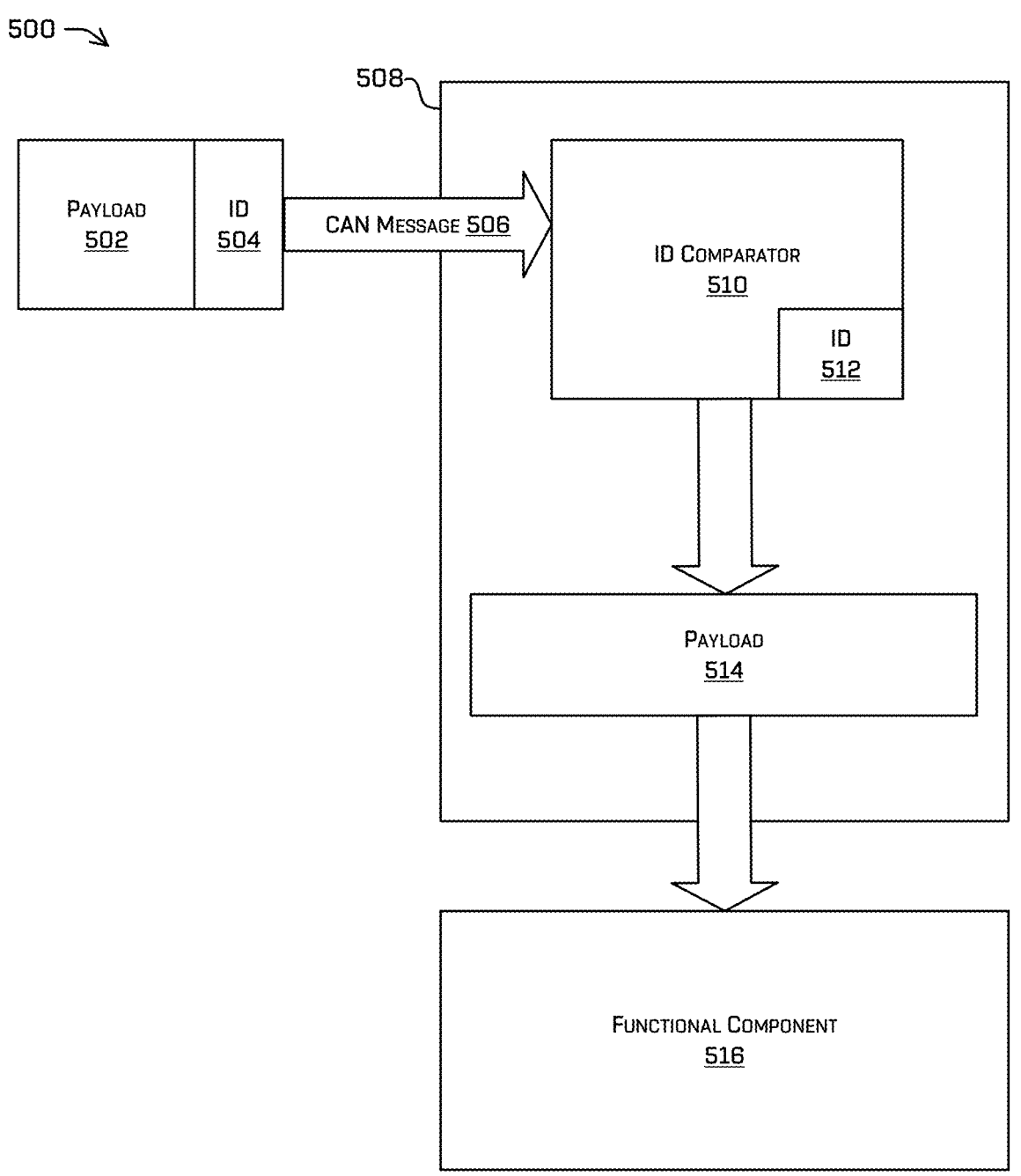
FIG. 5 depicts an example of a hardware circuit to process CAN bus messages for enabling and disabling a functional component of an electric aircraft, according to at least one example.

FIG. 5 depicts a block diagram 500 of an example of a hardware circuit 508 to process CAN bus messages for enabling and disabling a functional component 516 of an electric aircraft, according to at least one example. The electric aircraft includes various functional components 516 for operation of the electric aircraft and may include pro-pulsors, actuators, or other such components such as an inverter used to provide electric energy to the aircraft's motor, or an actuator used to control positioning of a control surface (e.g., an aileron, an elevator, a rudder, and/or the like) of the electric aircraft. In accordance with some of the techniques described herein, a command processor may receive a command pilot signal generated by a flight con-troller component based on pilot control input data. The command processor may convey information to one or more components of the aircraft to instruct operation of the functional component 516 based on the command pilot signal generated in response to the pilot control input data.

The electric aircraft may include one or more propulsors driven by at least one electric motor supplied and controlled by an inverter as instructed by the command processor. In such examples, the functional component 516 may include the inverter and/or propulsor components such as a motor. Accordingly, as the pilot input data indicates in increase in thrust, the command processor may cause the inverter to control operation of the motor and provide power to increase power delivered from a battery or other power source of the aircraft to the motor to increase the thrust of the propulsor.

In a more particular example, the electric aircraft may include a plurality of lift propulsors as well as one or more forward propulsors to drive the aircraft. The multiple motors of the electric aircraft may be driven by a flight controller and are powered through inverters, with each of the motors potentially receiving power through one or more inverters. Accordingly, the large number of inverters present on the aircraft increases to complexity of controlling power and of controlling operation of the different inverters. The inverters are connected to the command processor and/or flight controller of the electric aircraft through a controller area network (CAN) bus connection (e.g., are each connected to the CAN bus of the aircraft). The inverters receive commands from the CAN bus and act accordingly, for example as dictated by a control module of the inverter.

The CAN bus may be used for communications across the electric aircraft and to various of the functional components such as those described above. In an example, the functional component 516 may be powered by a high voltage system of the electric aircraft, and therefore does not have a low voltage system to separately power the functional component 516 and/or provide a signal to switch on/off in parallel.

Accordingly, the hardware circuit 508 is used to filter the CAN messages 506 to identify messages indicative of a change of state for a particular functional component 516 connected to the hardware circuit 508. The CAN message 506 includes a payload 502 component including the instruction to the functional component (e.g., enable, reset, shutdown, etc.) and also includes an identifier 504. The identifier 504 may include an identifier that is keyed to the identifier 512 associated with the functional component 516 as stored at the hardware circuit 508.

An identity comparator 510 of the hardware circuit 508 compares the identifier 504 of the CAN message 506 against the identifier 512 stored at the hardware circuit 508 and filters out all messages except those that correspond to a matching identifier at the identity comparator 510. Accordingly, the output of the identity comparator 510 is a payload 514 including an instruction for a change of state and/or operation for the functional component 516 such as an enable, reset, shutdown, mode change, or other such state change for the functional component 516. The payload 514 may then be passed to the functional component 516 to cause the functional component 516 to perform the requested change of state. In this manner, the hardware circuit 508 may listen to the traffic on the CAN bus and filter out all but a message related to a change of state of the functional component 516 and pass that payload 514 to the functional component 516.

In some examples, the hardware circuit 508 may be configured to detect a particular sequence of messages on the CAN bus in a particular order in order to pass the payload 514 to the functional component 516. In such examples, the identity comparator 510 may filter the messages, and the payload 514 may be aggregated across multiple messages to ensure that a complete sequence is received, further increasing the robustness and security with which state transitions are performed at the functional component 516. In some examples, an additional component of the hardware circuit 508 may be used to evaluate the order of the sequence of messages received and/or a particular spacing or time spacing between messages before passing the payload 514 to the functional component 516. In such examples, the hardware circuit 508 may only pass the payload 514 through to the functional component when all conditions are satisfied.

Figure 6:
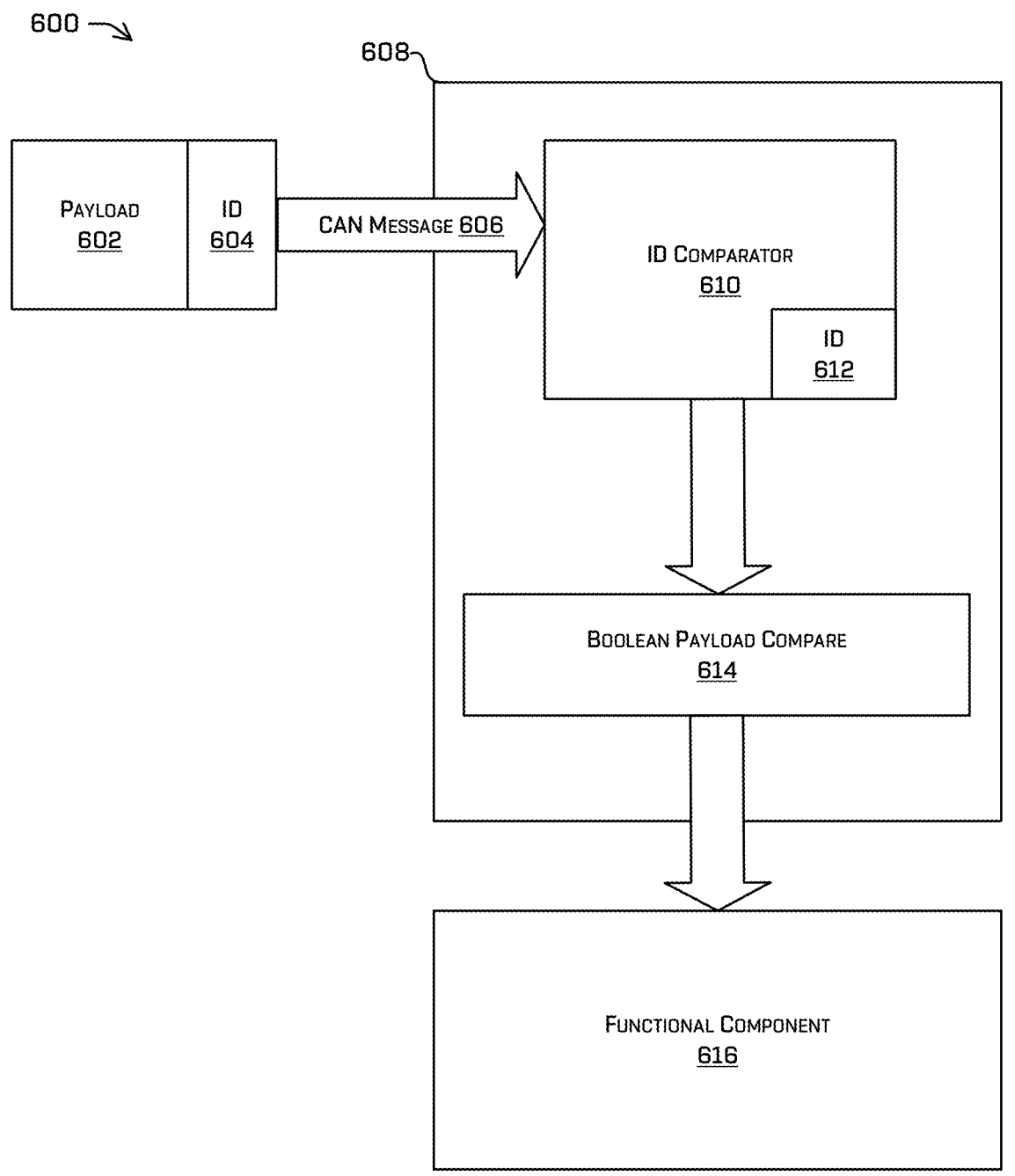
FIG. 6 depicts an example of a hardware circuit to process CAN bus messages for enabling and disabling a functional component of an electric aircraft, according to at least one example.

FIG. 6 depicts a block diagram 600 of a hardware circuit 608 to process the CAN bus messages 606 for enabling and disabling a functional component 616 of an electric aircraft, according to at least one example. The electric aircraft includes various functional components 616 for operation of the electric aircraft and may include propulsors, actuators, or other such components such as an inverter used to provide electric energy to the aircraft's motor, or an actuator used to control positioning of a control surface (e.g., an aileron, an elevator, a rudder, and/or the like) of the electric aircraft. In accordance with some of the techniques described herein, a command processor may receive a command pilot signal generated by a flight controller component based on pilot control input data. The command processor may convey information to one or more components of the aircraft to instruct operation of the functional component 616 based on the command pilot signal generated in response to the pilot control input data.

The electric aircraft may include one or more propulsors driven by at least one electric motor supplied and controlled by an inverter as instructed by the command processor. In such examples, the functional component 616 may include the inverter and/or propulsor components such as a motor. Accordingly, as the pilot input data indicates in increase in thrust, the command processor may cause the inverter to control operation of the motor and provide power to increase power delivered from a battery or other power source of the aircraft to the motor to increase the thrust of the propulsor.

In a more particular example, the electric aircraft may include a plurality of lift propulsors as well as one or more forward propulsors to drive the aircraft. The multiple motors of the electric aircraft may be driven by a flight controller and are powered through inverters, with each of the motors potentially receiving power through one or more inverters. Accordingly, the large number of inverters present on the aircraft increases to complexity of controlling power and of controlling operation of the different inverters. The inverters are connected to the command processor and/or flight controller of the electric aircraft through a controller area network (CAN) bus connection (e.g., are each connected to the CAN bus of the aircraft). The inverters receive commands from the CAN bus and act accordingly, for example as dictated by a control module of the inverter.

The CAN bus may be used for communications across the electric aircraft and to various of the functional components such as those described above. In an example, the functional component 616 may be powered by a high voltage system of the electric aircraft, and therefore does not have a low voltage system to separately power the functional component 616 and/or provide a signal to switch on/off in parallel.

Accordingly, the hardware circuit 608 is used to filter the CAN messages 606 to identify messages indicative of a change of state for a particular functional component 516 connected to the hardware circuit 608. The CAN message 606 includes a payload 602 component including the instruction to the functional component (e.g., enable, reset, shutdown, etc.) and also includes an identifier 604. The identifier 604 may include an identifier that is keyed to the identifier 612 associated with the functional component 616 as stored at the hardware circuit 608.

An identity comparator 610 of the hardware circuit 608 compares the identifier 604 of the CAN message 606 against the identifier 612 stored at the hardware circuit 608 and filters out all messages except those that correspond to a matching identifier at the identity comparator 610. Accordingly, the output of the identity comparator 610 to a Boolean payload comparator 614 for further confirmation and output of a command including an instruction for a change of state and/or operation for the functional component 616 such as an enable, reset, shutdown, mode change, or other such state change for the functional component 616.

In some examples, the hardware circuit 608 may be configured to detect a particular sequence of messages on the CAN bus in a particular order in order to pass the payload 602 to the functional component 616. In such examples, the identity comparator 610 and Boolean payload comparator 614 may filter the messages, and the payload 602 may be aggregated across multiple messages to ensure that a complete sequence is received, further increasing the robustness and security with which state transitions are performed at the functional component 616. In some examples, an additional component of the hardware circuit 608 may be used to evaluate the order of the sequence of messages received and/or a particular spacing or time spacing between messages before passing the payload 602 to the functional component 616. In such examples, the hardware circuit 608 may only pass the payload 602 through to the functional component when all conditions are satisfied.

The hardware circuit 608 may additionally evaluate the CAN message 606 based on the identifier 604 as well as the payload 602. For instance, the identity comparator 610 may evaluate the identifier 604 against the identifier 612 and a Boolean payload comparator 614 may compare the payload 602 against a pre-stored payload and/or key. The Boolean payload comparator 614 may therefore be used to evaluate the CAN message 606 in addition to the identity comparator 610 before conveying the message to the functional component 616. In the event that both evaluations are confirmed, the hardware circuit 608 may represent a successful de-keying and therefore result in a change in state of the functional component 616.

Figure 7:
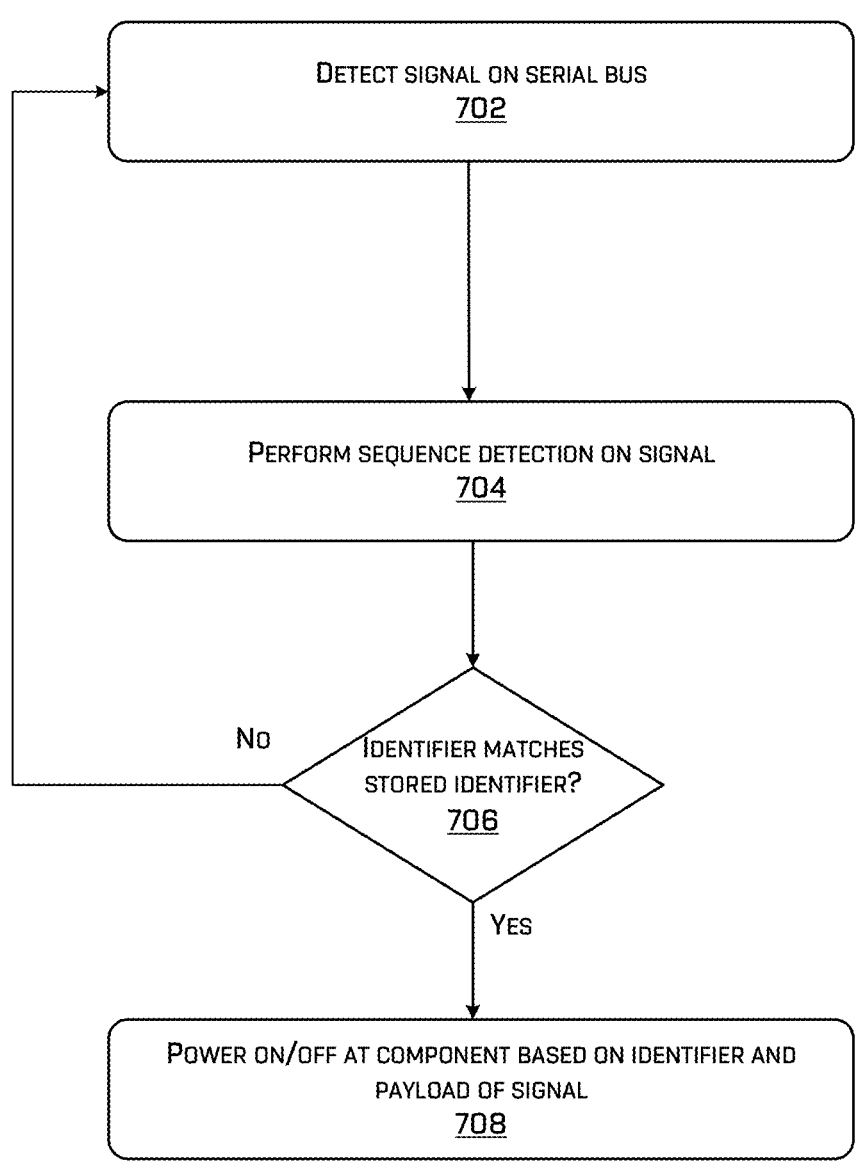
FIG. 7 depicts a flow chart for a process of enabling a flight component using a hardware circuit to form a sequence determination state machine in an electric aircraft, according to at least one example.

FIG. 7 depicts a flow chart for a process of enabling a flight component using a hardware circuit to form a sequence determination state machine in an electric aircraft, according to at least one example.

At operation 702, the process 700 includes a hardware circuit detecting and/or receiving signals from a serial bus connected to a flight component. The serial bus may include a CAN bus of an electric vehicle such as an electric aircraft. The hardware circuit may include a hardware component configured to read signals from the serial bus. The hardware component may include a programmable logic device and/or a FPGA in some implementations.

At operation 704, the process 700 includes performing a sequence detection on the signal from the serial bus. The sequence detection is based on an identity of the message from the serial bus. In an example, a comparator of the hardware component may be used to verify an identifier against the stored identifier at operation 706. In an instance where the identifier matches the stored identifier at operation 706, the message from the serial bus is conveyed to a functional component, such as to power on/off a functional component and/or change a state of the functional component at operation 708. In some examples, at operation 706, if the identifier doesn't match, the state of the functional component remains unchanged and the process 700 returns to operation 702. In some examples, the comparison may include a comparison of the payload of the message in addition to the verification of the identifier.

Figure 8:
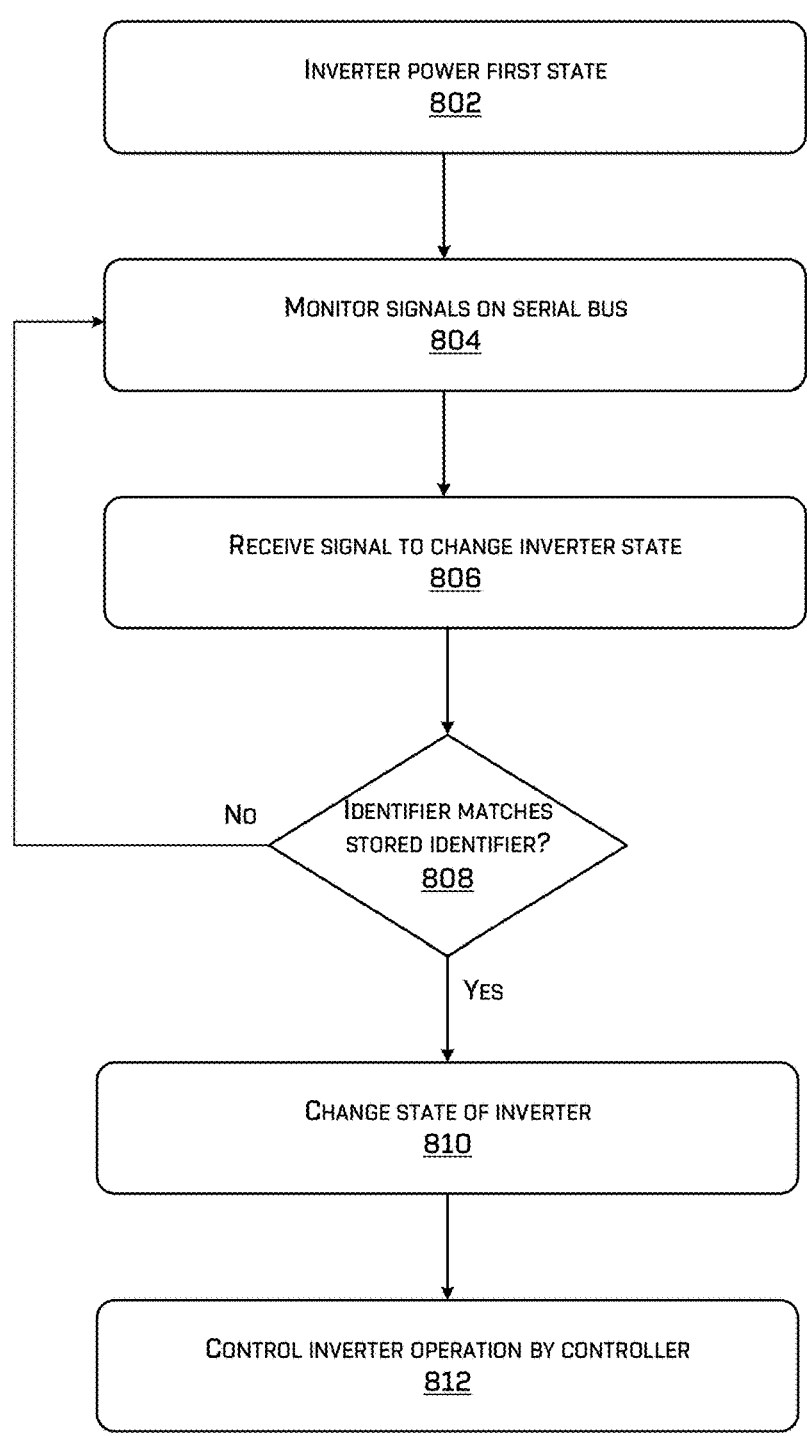
FIG. 8 depicts a flow chart for a process of enabling an inverter of a propulsor using a hardware circuit in an electric aircraft, according to at least one example.

FIG. 8 depicts a flow chart for a process of enabling an inverter of a propulsor using a hardware circuit in an electric aircraft, according to at least one example. In some examples, the inverter may include an inverter associated with a motor and a propulsor of a propulsion system of an electric aircraft. At operation 802, the process 800 includes the inverter operating in a first state. In some examples, the first state may include the inverter operating in a power-on mode or in a powered-off mode.

At operation 804, the process 800 includes a hardware circuit detecting and/or receiving signals from a serial bus connected to a flight component. The serial bus may include a CAN bus of an electric vehicle such as an electric aircraft. The hardware circuit may include a hardware component configured to read signals from the serial bus. The hardware component may include a programmable logic device and/or a FPGA in some implementations. At operation 806, the process 800 includes receiving a signal indicating a change in a state of the inverter. In some examples, the CAN bus signal and/or serial bus signal may include a signal instructing the inverter to reset, shutdown, change from powered-on to powered-off, change from powered-off to powered-on, or otherwise change an operational state of the inverter.

At operation 808, the process 800 includes evaluating whether an identifier of the message received at the serial bus matches a stored identifier at the hardware component. The evaluation may include a sequence detection based on an identity of the message from the serial bus. In an example, a comparator of the hardware component may be used to verify an identifier against the stored identifier at operation 808. In an instance where the identifier matches the stored identifier at operation 808, the message from the serial bus is conveyed to the inverter to cause the change in state. In some examples, at operation 808, if the identifier doesn't match, the state of the inverter remains unchanged and the process 800 returns to operation 804 without changing the state of the inverter. In some examples, the comparison may include a comparison of the payload of the message in addition to the verification of the identifier.

At operation 810, the process 800 includes changing a state of the inverter based on the message from the serial bus in response to the identifier and/or payload matching the stored and/or pre-coded identifier or payload comparison at the hardware component. The state of the inverter may be altered to reset, power-on, power-off, or otherwise change an operational state of the inverter. At operation 812, the process 800 includes controlling the inverter using a flight controller in the second state. In some examples, the second state is a state of normal operation where the flight controller causes the inverter to provide power to a motor of a propulsor to adjust thrust and/or lift in response to pilot input controls.

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Additionally, those having ordinary skill in the art readily recognize that the techniques described above can be used in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this description.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A flight component of an electric aircraft, the flight component comprising: a high voltage connection to a power supply of the electric aircraft; a communication connection to a communication bus of the electric aircraft; a hardware circuit configured to: receive generate a command signal to change a state of the flight component independent of a processing element of the flight component by: receiving a bus signal on the communication bus; comparing an identifier of the communication bus signal against a stored identifier of the flight component; and in response to the identifier matching the stored identifier, causing the flight component to change from a first state to a second state.

B: The flight component of paragraph A, further comprising: a motor for a propulsor of the electric aircraft; and an inverter configured to provide power to the motor and control operation of the electric aircraft in response to signals from a flight controller, wherein the hardware circuit is coupled to the inverter and configured to cause the inverter to change from the first state to the second state.

C: The flight component of paragraph B, wherein: the first state comprises a power-off state; the second state comprises a power-on state; and when the flight component is in the second state, a processor of the inverter is configured to control operation of the inverter in response to the signals from the flight controller.

D: The flight component of any of paragraphs A-C, further comprising a controller unit configured to control delivery of power from the high voltage connection to a motor, and wherein the hardware circuit causing the flight component to change from the first state to the second state comprises the hardware circuit conveying a message to enable power delivery to the controller unit.

E: The flight component of any of paragraphs A-D, further comprising one or more circuitry components communicably connected with the hardware circuit; and a functional component of the flight component controlled at least in part by signals from the one or more circuity components, and wherein the hardware circuit causing the flight component to change from the first state to the second state comprises the hardware circuit conveying a message to enable power delivery to the controller unit.

F: The flight component of any of paragraphs A-E, wherein the bus signal comprises a series of messages, and the hardware circuit being configured to compare the identifier against the stored identifier comprises: comparing a first identifier of a first message of the series of messages against at least a first portion of the stored identifier; and comparing a second identifier of a second message of the series of messages against at least a second portion of the stored identifier.

G: The flight component of any of paragraphs A-F, wherein the hardware circuit being configured to cause the flight component to change from the first state to the second state comprises enabling the power supply of the electric aircraft to provide power to the flight component in the second state, wherein the flight component is controllable in the second state by a flight computer of the electric aircraft.

H: The flight component of any of paragraphs A-G, wherein the serial bus signal comprises a first signal from a first flight controller and a second signal from a second flight controller.

I: The flight component of any of paragraphs A-H, wherein the hardware circuit comprises a sequence detection state machine.

J: The flight component of any of paragraphs A-I, wherein the hardware circuit being configured to compare the identifier against the stored identifier comprises performing a bit-wise comparison of the identifier and the stored identifier.

K: A propulsor for an electric aircraft comprising: a motor; and an inverter configured to provide power to drive the motor, the inverter comprising: a high voltage connection between a power supply of the electric aircraft and the inverter; a hardware circuit connected to a communication bus of the electric aircraft and configured to: receive a plurality of bus messages on the serial bus; compare an identifier of a bus message of the plurality of bus messages against a stored identifier of the propulsor; and in response to the identifier matching the stored identifier, cause the inverter to change from a first power state to a second power state.

L: The propulsor of paragraph K, wherein: the inverter comprises a controller unit; and one or more circuitry components for conditioning power delivered to the motor, and wherein the hardware circuit is configured to cause the inverter to change from the first power state to the second power state by at least transmitting a signal to change a state of the controller unit or the one or more circuitry components.

M: The propulsor of paragraph L, wherein transmitting the signal to change the state of the controller unit or the one or more circuitry components comprises enabling power delivery to at least one of the controller unit or the one or more circuitry components.

N: The propulsor of paragraph M, wherein: the serial bus messages comprise a first message from a first flight controller and a second message from a second flight controller; and the hardware circuit being configured to compare the identifier against the stored identifier comprises: comparing a first identifier of the first message against the stored identifier; and comparing a second identifier of the second message against the stored identifier.

O: The propulsor of any of paragraphs K-N, wherein the hardware circuit being configured to compare the identifier against the stored identifier comprises the hardware circuit being configured to: perform a bit-wise comparison of the identifier against the stored identifier; and perform a bit-wise comparison of a payload of the bus message against a stored identifier, and wherein causing the inverter to change to the second power state is in response to the identifier matching the stored identifier and the payload matching a pre-coded message stored in associated with the stored identifier.

P: The propulsor of any of paragraphs K-O, wherein: the first power state comprises a power-off state; the second power state comprises a power-on state; and where the inverter is in the second power state, a processor of the inverter is configured to control operation of the inverter in response to signals from at least one flight controller.

Q: An electric aircraft comprising: a power supply; a flight controller; a communication bus connected to the flight controller; a propulsor connected to the communication bus and comprising: a motor; and an inverter configured to provide power to drive the motor, the inverter comprising: a high voltage connection between a power supply of the electric aircraft and the inverter; a control unit configured to receive a command from the flight controller and deliver power to the motor; a circuitry component for delivering power to the motor in accordance with a control signal from the control unit; and a hardware circuit connected to the communication bus of the electric aircraft and configured to: receive bus messages on the communication bus; compare an identifier of a bus message of the communication bus messages against a stored identifier of the propulsor; and in response to the identifier matching the stored identifier, cause the inverter to change from a first power state to a second power state.

R: The electric aircraft of paragraph Q, wherein the flight controller is a first flight controller, and further comprising a second flight controller connected to the communication bus, and wherein: the identifier is a first identifier of the bus message from the first flight controller; and the hardware circuit being configured to cause the inverter to change to the second power state is further in response to a comparison of a second identifier of a second bus message from the second flight controller.

S: The electric aircraft of paragraph Q or R, wherein the hardware circuit being configured to cause the inverter to change from the power state to the second power state comprises causing power to be delivered to the control unit or the circuitry component.

T: The electric aircraft of any of paragraphs Q-S, wherein the hardware circuit being configured to compare the identifier against the stored identifier comprises the hardware circuit being configured to: perform a bit-wise comparison of the identifier against the stored identifier; and perform a bit-wise comparison of a payload of the bus message against a pre-coded message, and wherein causing the inverter to change to the second power state is in response to the identifier matching the stored identifier and the payload matching the pre-coded message.

What is claimed is:

1. A flight component of an electric aircraft, the flight component comprising:

a high voltage connection to a power supply of the electric aircraft;

a communication connection to a communication bus of the electric aircraft;

a hardware circuit configured to generate a command signal to change a state of the flight component independent of a processing element of the flight component by:

receiving a bus signal on the communication bus;

comparing an identifier of the communication bus signal against a stored identifier of the flight component; and in response to the identifier matching the stored identifier, causing the flight component to change from a first state to a second state.

2. The flight component of claim 1, further comprising:

a motor for a propulsor of the electric aircraft; and an inverter configured to provide power to the motor and control operation of the electric aircraft in response to signals from a flight controller, wherein the hardware circuit is coupled to the inverter and configured to cause the inverter to change from the first state to the second state.

3. The flight component of claim 2, wherein:

the first state comprises a power-off state;

the second state comprises a power-on state; and when the flight component is in the second state, a processor of the inverter is configured to control operation of the inverter in response to the signals from the flight controller.

4. The flight component of claim 1, further comprising a controller unit configured to control delivery of power from the high voltage connection to a motor, and wherein the hardware circuit causing the flight component to change from the first state to the second state comprises the hardware circuit conveying a message to enable power delivery to the controller unit.

5. The flight component of claim 1, further comprising one or more circuitry components communicably connected with the hardware circuit; and a functional component of the flight component controlled at least in part by signals from the one or more circuitry components, and wherein the hardware circuit causing the flight component to change from the first state to the second state comprises the hardware circuit conveying a message to enable power delivery to the controller unit.

6. The flight component of claim 1, wherein the bus signal comprises a series of messages, and the hardware circuit being configured to compare the identifier against the stored identifier comprises:

comparing a first identifier of a first message of the series of messages against at least a first portion of the stored identifier; and comparing a second identifier of a second message of the series of messages against at least a second portion of the stored identifier.

7. The flight component of claim 1, wherein the hardware circuit being configured to cause the flight component to change from the first state to the second state comprises enabling the power supply of the electric aircraft to provide power to the flight component in the second state, wherein the flight component is controllable in the second state by a flight computer of the electric aircraft.

8. The flight component of claim 1, wherein the bus signal comprises a first signal from a first flight controller and a second signal from a second flight controller.

9. The flight component of claim 1, wherein the hardware circuit comprises a sequence detection state machine.

10. The flight component of claim 1, wherein the hardware circuit being configured to compare the identifier against the stored identifier comprises performing a bit-wise comparison of the identifier and the stored identifier.

11. A propulsor for an electric aircraft comprising:
a motor; and
an inverter configured to provide power to drive the motor, the inverter comprising:
a high voltage connection between a power supply of the electric aircraft and the inverter;
a hardware circuit connected to a communication bus of the electric aircraft and configured to:
receive a plurality of bus messages on the serial bus;
compare an identifier of a bus message of the plurality of bus messages against a stored identifier of the propulsor; and
in response to the identifier matching the stored identifier, cause the inverter to change from a first power state to a second power state.

12. The propulsor of claim 11, wherein:
the inverter comprises a controller unit; and
one or more circuitry components for conditioning power delivered to the motor, and wherein the hardware circuit is configured to cause the inverter to change from the first power state to the second power state by at least transmitting a signal to change a state of the controller unit or the one or more circuitry components.

13. The propulsor of claim 12, wherein transmitting the signal to change the state of the controller unit or the one or more circuitry components comprises enabling power delivery to at least one of the controller unit or the one or more circuitry components.

14. The propulsor of claim 13, wherein:
the bus messages comprise a first message from a first flight controller and a second message from a second flight controller; and
the hardware circuit being configured to compare the identifier against the stored identifier comprises:
comparing a first identifier of the first message against the stored identifier; and
comparing a second identifier of the second message against the stored identifier.

15. The propulsor of claim 11, wherein the hardware circuit being configured to compare the identifier against the stored identifier comprises the hardware circuit being configured to:
perform a bit-wise comparison of the identifier against the stored identifier; and perform a bit-wise comparison of a payload of the bus message against a stored identifier, and wherein causing the inverter to change to the second power state is in response to the identifier matching the stored identifier and the payload matching a pre-coded message stored in associated with the stored identifier.

16. The propulsor of claim 11, wherein:
the first power state comprises a power-off state;
the second power state comprises a power-on state; and
when the inverter is in the second power state, a processor of the inverter is configured to control operation of the inverter in response to signals from at least one flight controller.

17. An electric aircraft comprising:
a power supply;
a flight controller;
a communication bus connected to the flight controller;
a propulsor connected to the communication bus and comprising:
a motor; and
an inverter configured to provide power to drive the motor, the inverter comprising:
a high voltage connection between a power supply of the electric aircraft and the inverter;
a control unit configured to receive a command from the flight controller and deliver power to the motor;
a circuitry component for delivering power to the motor in accordance with a control signal from the control unit; and
a hardware circuit connected to the communication bus of the electric aircraft and configured to:
receive bus messages on the communication bus;
compare an identifier of a bus message of the communication bus messages against a stored identifier of the propulsor; and
in response to the identifier matching the stored identifier, cause the inverter to change from a first power state to a second power state.

18. The electric aircraft of claim 17, wherein the flight controller is a first flight controller, and further comprising a second flight controller connected to the communication bus, and wherein:
the identifier is a first identifier of the bus message from the first flight controller; and
the hardware circuit being configured to cause the inverter to change to the second power state is further in response to a comparison of a second identifier of a second bus message from the second flight controller.

19. The electric aircraft of claim 17, wherein the hardware circuit being configured to cause the inverter to change from the first power state to the second power state comprises causing power to be delivered to the control unit or the circuitry component.

20. The electric aircraft of claim 17, wherein the hardware circuit being configured to compare the identifier against the stored identifier comprises the hardware circuit being configured to:
perform a bit-wise comparison of the identifier against the stored identifier; and
perform a bit-wise comparison of a payload of the bus message against a pre-coded message, and wherein causing the inverter to change to the second power state is in response to the identifier matching the stored identifier and the payload matching the pre-coded message.

* * * * *